FLUID-GATE HEAD READING

Filed Oct. 8, 1965

INVENTOR
ROBERT F. BROWN, JR

BY Alexander & Dowell
ATTORNEYS 3,444,331
FLUX-GATE HEAD READING

Robert F. Brown, Jr., Dallas, Tex., assignor to The Geotechnical Corporation (a Division of Teledyne Industries Inc.), a corporation of Delaware Filed Oct. 8, 1965, Ser. No. 493,982
Int. Cl. G11b 5/30
U.S. Cl. 179—100.2 6 Claims

ABSTRACT OF THE DISCLOSURE

A method and apparatus for reading the density of a flux induced in the saturable core of a magnetic transducer in which an exciter signal of frequency which is high as compared with the frequency of the induced flux is used to unidirectionally saturate and then unsaturate a portion of said core. The circuit then obtains from other windings on the core intelligence pulse signals whose pulse positions correspond to the moments of core saturation and unsaturation by the exciter signal, and whose amplitudes are proportional to the momentary induced flux. A portion of the exciter signal is also coupled to provide a substantially constant drive to a resonant circuit tuned to the fundamental of the exciter signal frequency to maintain thereacross a ringing signal, and the amplitude of this ringing signal is then further modulated by applying said pulse signals to also drive the same resonant circuit, such further drive being proportional to said induced flux. Especially where the exciter frequency is fairly high it is desirable to provide means for adjusting the relative phases of said applied signals to maximize modulation of the ringing signal across the resonant circuit, which condition occurs where the two drives are most nearly in phase. Means is also provided to automatically enhance the percent modulation of the composite ringing signal appearing across the resonant circuit, which signal is then amplitude demodulated.

This invention relates to a method and to a system for reading an input signal flux employing circuits and flux-gate heads of the type which can read magnetic fields appearing across a gap in the magnetic path of the head. More particularly, the invention relates to reading circuits capable of reading flux density on a recording medium independent of the velocity of the recording medium relative to the head, and including zero velocity.

There are a large number of prior-art magnetometer systems and flux-gate head reading systems capable of reading tapes even when motionless with respect to the head, most of such systems being of the second-harmonic response type in which zones of the magnetic circuit of the head are periodically saturated by a winding driven by a supersonic oscillator. A D.C. offset bias is then introduced into the magnetic circuit to provide a mean offset flux about which the head flux level will vary in response to the input signal flux, said offset being large enough so that the head flux level never goes through zero flux. This provides in an output winding a waveform comprising pulses appearing at double the supersonic rate and having a peak envelope which varies with the magnetic signal field being read. Good examples of such prior art systems appear in Kornei Patent 2,905,770 and in Stuart Patent 2,785,233, both of which apply a steady offset bias to the head's magnetic path by passing D.C. through a winding disposed about said path.

The present invention discloses a different approach to flux-gate systems which does not operate on the second-harmonic principle and which does not use any offset bias applied to the magnetic core of the flux-gate head. In the above-mentioned prior art systems the supersonic excitation applied to the head is bidirectional so that the head is saturated twice in opposite directions during each sine wave cycle of the A.C. excitation current, hence the second-harmonic response. In the present novel system, unidirectional square-wave excitation pulses are applied to the head by excitation windings wound in such a way that the excitation signal does not appear across the reading gap. These unidirectional pulses never cross the zero-axis, but operate in a switching mode between zero and full saturation of the core in one direction only. Therefore there is saturation of the core in one direction only, and only once per cycle of the excitation.

In the above-described prior-art systems, the offset bias is necessary in order to obtain a detected output waveform representing the signal flux. In the present novel system, this result is obtained, not by offset biasing the core of the head, but rather by external electrical combining of the output signal of the head with a reference signal derived from the same square-wave generator which supplies excitation to the head core.

It is a principal object of this invention to provide a novel flux-responsive read system in which no offset bias is applied to the core of the magnetic head. The elimination of such bias is considered to be an advantage, particularly in precision flux responsive systems, because it eliminates one source of noise and fluctuation from the head. Despite the fact that the A.C. excitation is applied to the core in such a way that it cancels out at the gap, in the prior art systems, the offset bias is applied in such a way that it is part of the output signal, and if it fluctuates, such fluctuation is indistinguishable from a change in the signal flux being read by the system. Likewise, any noise on the bias current becomes part of the signal read. As a practical matter, it is quite difficult to apply a non-saturating D.C. bias current to a head without any fluctuation or inherent noise.

It is another principal object of this invention to provide an improved read system in which the exciter winding is driven by saturating square waves and these square waves are strictly unidirectional. In other words, they never cross the zero axis. The presence of these square waves in the exciting winding causes the permeability of the core to vary, and thereby the flux introduced by the tape, even when motionless, is chopped at the rate of the exciting square wave. This provides an alternating component of flux in the head which can be picked up by a signal winding as an electrical signal and delivered for amplification and detection to the input of a following circuit. When the exciter winding saturates the core in the excited region the field that the tape had produced in the core is driven out and an output pulse appears in the pick-up winding. When the core comes back out of saturation the signal field goes back through the core and another output pulse is produced, this time of opposite polarity to the first pulse. However, the output pulse produced at core saturation for a given polarity of tape field is the same as the output pulse produced at core unsaturation for the opposite polarity of tape field. Therefore, to keep track of field polarity it is necessary to use a head output detector that can be synchronized with the exciter drive so as to separate the output pulses due to head saturation from those due to head unsaturation.

Still another major object of the invention is to provide a novel read circuit in which polarity ambiguities are eliminated by synchronously adding a portion of the excitation square wave drive to the output of the signal winding of the head to displace the resultant waveform away from the zero axis so that the peak envelope of the resultant waveform has the shape of the flux signal read from the tape.

A further major object of the invention is to provide in said read circuit a novel detection system in which said resultant waveform is first operated upon by a peak detector to enhance the percent modulation thereof, and then the enhanced wave is detected to recover the original signal.

Yet another important object of the invention is to provide novel circuitry for automatically adjusting the percent-modulation enhancing means to maintain optimum performance despite varying input signal amplitudes from the tape.

A further object is to provide a read system capable of reading tape signals which are very weak as compared with the strength of residual fields in the head core and with cross-talk from the exciting windings of the head.

An important advantage of the present system employing unidirectional square wave excitation resides in unexpectedly good performance of a read system wherein the same unidirectional square wave excitation current is passed in series through the exciting windings of a large number of heads, for instance for reading multiple-track tapes. When a conventional A.C. excitation current is employed with multiple heads, the performance of the various heads changes as they are selectively switched in and out of the read circuits; but, for reasons which are not fully understood, when unidirectional square wave excitation of the heads is employed, there appears to be no variation in performance as different heads and different numbers of heads are selected. This improvement may result from the fact that large core-losses associated with A.C. excitation are not present with unidirectional excitation.

Other objects and advantages of the present invention will become apparent during the following discussion of the drawings, wherein.

The method of the present invention provides a way of detecting the output signal from a chapped flux gate head in order to recover a signal corresponding with the magnitude of the flux introduced into the core at a conventional gap, for instance a flux from some other magnetic field such as the earth's magnetic field. Although other prior-art systems have used second-harmonic detection methods usually including the provision of offset bias upon the recording head, the present invention does not use second-harmonic detection methods nor does it contemplate applying an offset bias to the head. Instead, the excitation to the head is made unidirectional, and is of such magnitude as to saturate the head always in the same direction when the exciting square wave reaches its maximum value. The present method further provides detection of the head's output signal by first filtering this signal to eliminate all harmonic components except the fundamental component; by also separately filtering the output taken directly from the exciter source to obtain a pure fundamental reference component thereof; by then phase-shafting the latter component until it is in phase with the output fundamental obtained from the head; and by combining these two filtered fundamentals which are then added together across a circuit tuned to the fundamental frequency in order to produce a signal having a constant level pedestal portion comprising the fundamental reference component initiated by the square excitation source and a superimposed variable intelligence component representing the signal read from the tape. The fundamental sine wave component comprising the pedestal is made much gerater in amplitude than the superimposed intelligence component so that the latter never reaches down to the zero axis. The present method then enhances the variable component hearing the desired intelligence by removing most of the non-useful pedestal portion of the combined output so as to leave a signal comprising the fundamental component of the square wave source, amplitude-modulated to a much higher percentage by the intelligence signal. An amplitude demodulator is then used to recover the modulation representing the original signal. One novel feature of the present invention is to provide automatic level control means which serves to adjust the amplitude-modulation enhancing circuit so as to eliminate as much of the unmodulated pedestal component of the resultant waveform as possible without eliminating any of the intelligence bearing component.

Figure 1:
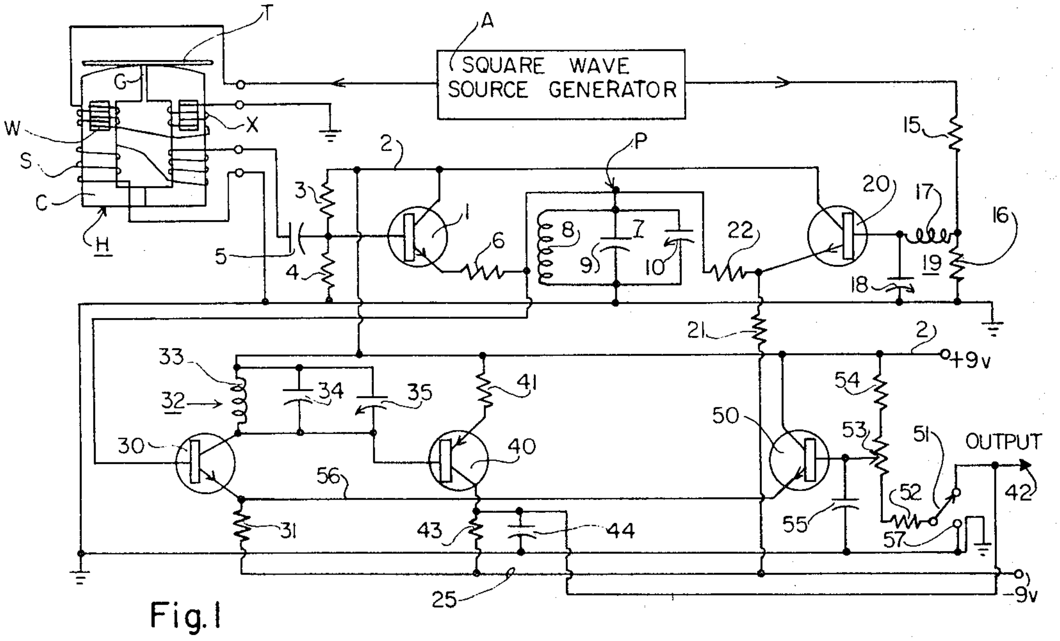
FIG. 1 is a schematic diagram showing one novel embodiment of a head reader system.

Referring now to FIG. 1, this figure shows a schematic diagram including a magnetic head located in operative relationship with a magnetic recording tape T which may be driven by suitable tape deck driving means (not shown). The head H includes core members C having a gap G across which the tape T is driven. The core members C have one or more windows W into which exciting windings X are wound in such a way as to saturate the legs of the cores C, without introducing flux into the portions of the core legs which are remotely located with respect to the windows W. The head also has signal windings S.

Figures 2, 3:
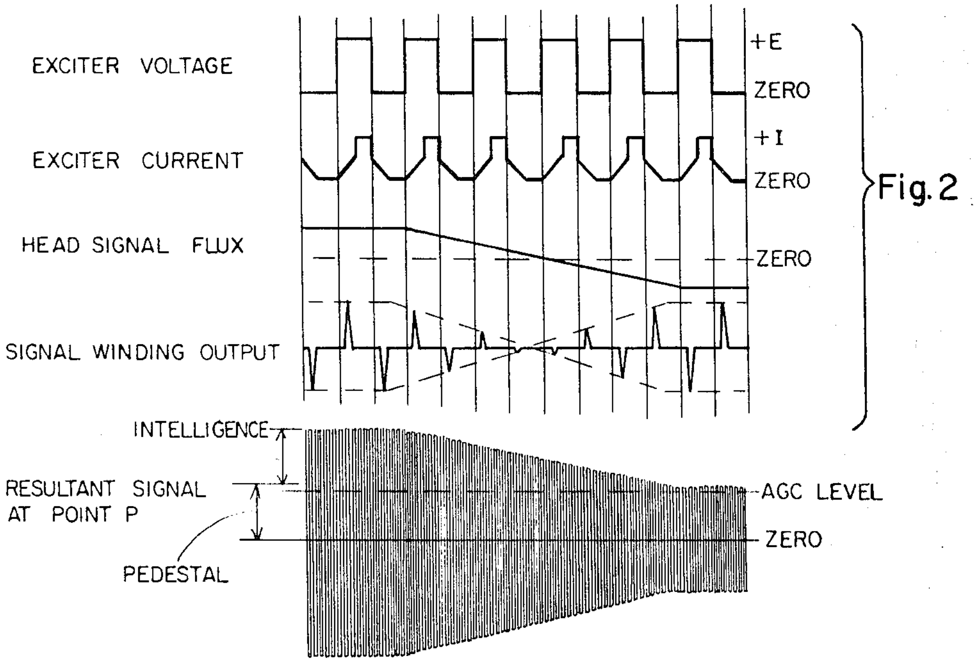
FIG. 2 shows a set of operating waveforms relating to the head and windings thereof.
FIG. 3 shows a waveform appearing across a tuned circuit within the system shown in FIG. 1.

The exciter windings X are excited by a square wave of the type shown in the first two lines of FIG. 2, in which the excitation voltage is a unidirectional square wave always going in the positive direction from the zero axis. The positive direction is merely an arbitrary selection made for the purpose of providing an illustrative embodiment. The exciter current through the windings X is not as nearly square as the voltage, but is rounded off to a certain extent by the inductance of the windings X. The voltage and current to the exciting windings X are delivered from a square wave generator A which can be of any suitable design provided the generator is extremely stable, both as to waveform and as to amplitude. This generator has two outputs, both outputs being made as nearly identical as possible. One output from the left end of the generator A is connected to drive the exciter windings while the other output from the right end of the generator is connected to a portion of the external circuitry, as is about to be described.

The signal winding S is connected to an isolation amplifier stage including a transistor 1 connected in the emitter-follower configuration and supplied with positive voltage from a plus nine volt wire 2. The base of the transistor 1 is provided with suitable forward bias by resistors 3 and 4, and is coupled to the signal winding through a blocking capacitor 5. The output signal from the transistor 1 is delivered from its emitter through a resistor 6 to the upper end of a tuned circuit 7 comprising an inductance 8 and capacitors 9 and 10 all tuned to the fundamental frequency of the square wave generator A. In the practical working embodiment of the circuit, the square waves developed by the generator A are at a supersonic rate of about 60 kc.

The output from the right-hand side of the square wave generator is delivered through a resistance 15 to a pi filter comprising resistance 16, inductance 17, and capacitor 18, the whole filter being identified by the reference numeral 19. This filter is tunned to pass the fudamental sine wave derived from the square wave generator A, and to eliminate harmonics thereof. The output of the filter 19 is delivered to the base of the transistor 20 which is supplied with positive power from the plus 9 volt wire 2, and is connected in the emitter-follow configuration. The base of the transistor 20 is provided with appropriate bias through filter 19 and an emitter return through the resistor 21 which connects with a minus 9 volt wire 25. The output from the emitter of transistor 20 is delivered through the resistor 22 also to the tuned circuit 27. Thus, both the transistor 1 and the transistor 20 deliver fundamental components of the square wave from the generator A to the point P across the tuned circuit 7, which comprises the load for both emitter-follower transistors. The capacitor 18 is adjusted so as to shift the output signal of the filter 19 to bring the sine wave delivered to point P through transistor 20 into phase coincidence with the signal delivered to the point P through the transistor 1 so that the two signals are additive across the tuned circuit 7 and provide a resultant waveform as shown in FIG. 3.

FIG. 3 shows a dashed line labeled "A.G.C. Level," and in general, the signal which appears above this level is mostly attributable to intelligence components taken from the signal winding S, whereas the signal appearing below the dashed line labeled "A.G.C. Level" and down to the zero axis is attributable principally to the reference signal delivered to the point P through the filter 19 and the transistor 20. The division between these two signals is not intended to be accurately represented by the "A.G.C. Level." Rather, the above description is merely intended to state that the reference signal taken from the transistor 20 is added to the intelligence signal taken from the transistor 1 in order to provide a pedestal beneath the intelligence signal so that it can never go through the zero axis. The position of the A.G.C. level represented by the dashed line in FIG. 3 is controlled by automatic means appearing in FIG. 1, and this automatic means is designed to remove as much of the pedestal component below the dashed line as possible without ever having any of the intelligence signal located above the dashed line removed. The portion of the waveform appearing below the zero axis in FIG. 3 is not discussed herein because it is eliminated entirely by the subsequent detector means, to be presently discussed.

In all likelihood, the amplitude of the pedestal component in a practical system will be very large as compared with the variable signal which bears the intelligence and is superimposed upon the pedestal signal. It is therefore desirable to make amplitude demodulation of the intelligence signal easier by enhancing the percent modulation of the resultant waveform shown in FIG. 3 prior to demodulation. This is accomplished in the transistor 30 by clipping and eliminating the pedestal signal located beneath the dashed "A.G.C. Level," FIG. 3. The resultant signal from the point P is therefore delivered to the base of the transistor 30, whose emitter is biased strongly positive and beyond cut-off by the voltage across resistor 31 that is produced by transistor 50. Thus, if the bias to the emitter of transistor 30 is properly selected, the transistor 30 can be made to amplify only the portion of the resultant signal of FIG. 3 which is located above the "A.G.C. Level" line, this being the intelligence bearing component of the signal. This amplified component of the signal is delivered to a tank circuit 32 comprising an inductance 33 and capacitors 34 and 35. The tank circuit 32 is tuned to the fundamental frequency of the square wave generator A. The output across the tank circuit 32 is delivered to the base of detector transistor 40 which comprises an ordinary amplitude demodulator which is biased by a suitable emitter resistance 41. An output to the terminal 42 is taken from the collector of transistor 40 across a suitable load resistance 43 provided with a by-pass condenser 44 to smooth the detected intelligence output signal.

The transistor 50 serves to automatically adjust the "A.G.C. Level" of the dashed line shown in FIG. 3 when the switch 51 is in the position shown in FIG. 1. Part of the output from the terminal 42 passes through the switch 51 and through resistors 52, 53, and 54. The resistance 53 is adjustable to control the sensitivity of the A.G.C. circuit, and the wiper of the resistance 53 is connected to the base of the transistor 50. The resistance 52 and part of the resistance 53 when taken with the capacitor 55 provides an R.C. time constant of relatively long duration. The transistor 50 therefore becomes an amplifier receiving power from the plus 9 volt wire 2 and having its emitter connected through a wire 56 to the emitter of the percent-modulation enhancing amplifier 30. The overall effect of the A.G.C. circuit is to move the "A.G.C. Level" dashed line in FIG. 3 up and down so as to keep it always just below the intelligence portion of the resultant signal, while at the same time never clipping any part of the intelligence signal. As the average amplitude of the resultant signal at point P becomes greater, the average potential appearing at terminal 42 will become more positive, thereby making the wiper at the resistor 53 more positive, and thereby raising the bias of the NPN transistor 50 which then draws more current through the resistance 31 so that the emitter thereof goes more positive; thus, the A.G.C. level line in FIG. 3 is raised.

Conversely, as the amplitude of the resultant signal in FIG. 3 decreases, the A.G.C. level dashed line in FIG. 3 can be moved downward by having the amount of current drawn through the resistor 31 reduced so that the emitter of transistor 30 goes more negative.

The time constant of the resistors 52 and 53 together with the capacitor 55 is long enough so that the level of the dashed line at FIG. 3 adjusts only slowly. Therefore, this time constant determines the lowest frequency response of the present system when the switch 51 is in the "up" position.

If it is desired to read a D.C. flux level, or to read a tape signal frequency below that obtainable with practical values of resistors 52 and 53 and capacitor 55 then the switch 51 must be placed in the "down" position so that the level of the dashed line is held constant by virtue of the fact that the base of the transistor 50 is referred to the ground potential at terminal 57, rather than to the average output level from the signal detector at terminal 42. The resulting fixed clipping level is then set by adjusting the wiper on resistance 53.

Referring now to FIG. 2, the first and second waveforms from the top show the exciter voltage and current applied from the square wave generator A to the exciter winding X on the core C, both waveforms extending from the zero axis in the positive direction only, in the present example. In the presence of signal flux in the core attributable to the tape T or any other source, the output of the winding S on the core would be alternate positive and negative narrow pulses of height and polarity determined by the flux in the core, and occurring respectively each time the exciter current causes saturation and each time such saturation ceases. The effect of changes in signal flux introduced into the core by a magnetic field across the gap is to modulate the height of the output pulses which still occur at instants of saturation and of unsaturation. The third waveform in FIG. 2 shows a signal flux commencing at a constant positive value, then going through zero to a negative value, and finally proceeding at a constant negative value. It is important to note that whenever the core C is saturated in the vicinity of the windows W, the signal flux through the core attributable to the tape at the gap G is broken, much in the same way as though the core were physically removed. The square wave excitation from the windings X induces no signal in the windings S. The head H is carefully constructed to assure this fact. Therefore all output at the winding S is attributable to the signal flux level at the gap G, and if this is a D.C. flux level, meaning that the tape T is motionless for example, then the pulses appearing in the fourth waveform in FIG. 2 will be constant in amplitude until the signal flux varies. The effect of such variation over a range of useful amplitudes is shown in the last two waveforms shown in FIG. 2. The fourth waveform also shows one other fact, namely that the spikes in the opposite directions are of the same height, regardless of the direction of the signal flux at the gap G.

This fact creates a polarity ambiguity which is resolved in the prior art by using offset head bias, but in the present invention, it is resolved not in the head but rather in the external circuitry by adding a reference waveform from the filter 19, FIG. 1, to the point P. This reference waveform contains no signal intelligence, but it is carefully synchronized and phased with the occurrence of the pulses delivered from winding S. It can therefore be used as a pedestal to which the smaller signal waveform is added to thereby produce the desired amplitude-modulated carrier signal. The precise way in which the reference signal from the filter 19, by insertion at point P, resolves the polarity ambiguity and produces the desired amplitude modulated signal can be explained by the following considerations. The signal winding output as shown at the bottom of FIG. 2 has been arbitrarily depicted as producing a positive output pulse when the core switches into saturation and a positive output pulse when the core switches into saturation and a positive signal flux is being read by the head gap. Similarly, the signal winding output produces a negative output pulse when the core switches out of saturation and a positive signal flux is being read by the head gap. When the signal flux reverses then the polarities of the two output pulses reverse, and the output pulse due to core saturation is now negative, whereas the output pulse due to core unsaturation is positive.

Consider now a reference pulse chain derived from generator A and comprising alternate positive and negative pulses of constant unvarying magnitude larger than the largest pulse magnitude to be obtained from the signal winding S, and this chain being phased to occur at the instants of core saturation and unsaturation and thus coincide with the time of arrival of the pulses from the signal winding output. Assume also that the phasing of the reference pulse chain is such that the positive pulse corresponds to the core switching into saturation. If the signal winding output pulse sequence is added to the reference pulse chain, then one gets the following: When the head signal flux is positive and the core switches into saturation the signal winding output is positive, the corresponding reference pulse is positive, and the sum of the two pulses is a positive pulse of magnitude larger than the reference pulse by the magnitude of the signal pulse added thereto. With the head signal flux still positive and the core switching into unsaturation, the signal winding output pulse is negative, the corresponding reference pulse is negative, and the sum is a negative pulse of magnitude larger than the reference pulse by the magnitude of the signal pulse. When the head signal flux becomes negative and the core switches into saturation, the signal winding output is negative, the corresponding reference pulse is positive, and the sum is a positive pulse of magnitude smaller than the reference pulse by the magnitude of the signal pulse. With the head signal flux still negative, when the core switches into unsaturation the signal winding output is positive, the corresponding reference pulse is negative, and the sum is a negative pulse of magnitude smaller than the reference pulse by the magnitude of the signal pulse. The action just described converts the signal winding output into a linear pulse-amplitude modulated signal. When this pulse amplitude-modulated signal is filtered by a filter tuned to the fundamental frequency it becomes a conventional sine wave carrier which is amplitude-modulated by the signal of the tape T.

As a practical matter, the use of the aforementioned rectangular reference pulse chain to be applied to point P would involve some difficulties, primarily in phase synchronization. However, since the output of a filtered pulse chain contains all the necessary information, and since the pulse combining process is a linear one of simple addition, it is recognized that the filtering can equally well take place before the adding process at point P, and that the same output would be available. Thus the signal winding output can be filtered and added at point P to a reference signal filtered to comprise a sine wave, and achieve the same result as would be obtained using an unfiltered pulse signal. For this reason the exciter voltage is filtered to produce the reference sine wave at point P, and the phase shifter 18 is introduced to provide for adjustment of the reference sine wave into proper phase with the filtered output of the signal winding output. Thus, the two sine waves are added to produce the amplitude modulated signal that is shown in FIG. 3 as the resultant signal at point P.

A set of working values for a practical embodiment of the circuit are as follows:

| | | |
|---|---|---|
| Resistors **3, 4** | ohms | 27,000 |
| Resistors **6, 22, 21** | do | 10,000 |
| Resistors **15, 31, 43** | do | 4,700 |
| Resistor **16** | do | 270 |
| Resistor **41** | do | 330 |
| Resistor **52** | do | 68,000 |
| Potentiometer **53** | do | 50,000 |
| Resistor **54** | do | 220,000 |
| Capacitor **5** | mfd | 10 |
| Capacitors **9, 34** | picofarad | 1,000 |
| Capacitors **10, 18, 35** | do | 180–780 |
| Capacitor **44** | microfarad | .01 |
| Capacitor **55** (select to set AGC time constant). | | |
| Transistors **1, 20, 30** and **50**, Texas Instrument 495. | | |
| Transistor **40** | | 2N2374 |
| Inductances **8** and **33** | millihenrys | 5 |
| Inductance **17** | do | 10 |

The present invention is not to be limited to the practical embodiment illustrated, for obviously changes can be made within the scope of the following claims.

I claim:

1. A flux-responsive system for delivering output signals representing instantaneous signal flux densities induced in a saturable magnetic core path, comprising:

(a) a source of exciter waves;

(b) means driven by said exciter waves for saturating and unsaturating at least a portion of said core path once per cycle of said wave;

(c) a tuned circuit resonant at the fundamental frequency of said waves;

(d) winding means on said core path connected to deliver to said tuned circuit an intelligence signal proportion in magnitude to said flux and chopped at the rate of said exciter waves;

(e) filter means tuned to the fundamental frequency of said exciter wave and coupled to said tuned circuit to drive the latter to produce a ringing signal at said fundamental frequency, and the filter means being adjustable to shift the phase of the ringing signal to bring it into phase with the phase of the chopped intelligence signal across the tuned circuit; and (f) means connected to said tuned circuit to amplitude-demodulate the resultant signal across the tuned circuit.

2. In a system as set forth in claim 1, said saturating means comprising core windings connected to conduct exciter wave current in one direction only to produce unidirectional saturation of the core path.

3. In a system as set forth in claim 1, said amplitude demodulating means including means for increasing the percent modulation of the resultant signal to a level approaching but below one hundred percent; and means for automatically adjusting said level as the amplitude of the intelligence component of the signal varies with flux density.

4. A flux-responsive system for delivering output signals representing instantaneous signal flux densities induced from a magnetic record in a saturable-core transducer, comprising:

(a) a source of unidirectional exciter waves;

(b) exciter winding means wound on the core and driven by said exciter waves for periodically blocking said core path by saturating it in one direction only and then unsaturating it;

(c) a tuned circuit resonant at the fundamental frequency of said waves;

(d) signal winding means on said core path connected to deliver to said tuned circuit an intelligence signal proportional in magnitude to said flux and chopped at the rate of said exciter waves;

(e) filter means to derive a reference signal from said exciter wave and comprising a fundamental thereof, said filter being adjustable to bring the reference signal into phase with said intelligence signal, and the filter being connected to deliver said reference signal to said tuned circuit to make it ring at an instantaneous amplitude as modulated by said intelligence signal to produce a resultant signal thereacross; and (f) means connected to said tuned circuit to amplitude-demodulate said resultant signal.

5. In a system as set forth in claim 4, said amplitude demodulating means including means for increasing the percent modulation of the resultant signal to a level approaching but below one hundred percent; and means for automatically adjusting said level as the amplitude of the intelligence component of the signal varies with flux density.

6. The method of reading the density of a flux induced in the saturable core of a magnetic transducer including the steps of generating an exciter signal of frequency which is high as compared with the frequency of the induced flux; unidirectionally saturating and the unsaturating at least a portion of said core with said exciter signal while deriving from the core intelligence pulse signals whose positions correspond to the moments of saturation and unsaturation and whose amplitudes are proportional to the momentary induced flux; applying a portion of said exciter signal to provide drive to a resonant circuit tuned to the fundamental of the exciter signal frequency to maintain thereacross a ringing signal; applying said pulse signals to also drive the same resonant circuit to impose upon its ringing a modulation proportional to said induced flux; adjusting the relative phases of said applied signals to maximize modulation of the ringing signal across the resonant circuit; and amplitude demodulating the ringing signal.

References Cited

UNITED STATES PATENTS

| | | | |
|---|---|---|---|
| 2,768,243 | 10/1956 | Hare | 179—100.2 |
| 3,164,684 | 1/1965 | Wiegand | 179—100.2 |
| 3,242,269 | 3/1966 | Pettengill | 179—100.2 |

BERNARD KONICK, *Primary Examiner.*

J. P. MULLINS, *Assistant Examiner.*